United States Patent [19]
Kinoshita et al.

[11] 3,804,081
[45] Apr. 16, 1974

[54] ENDOSCOPE

[75] Inventors: Kunio Kinoshita; Mitsuto Itoh, both of Tokyo, Japan

[73] Assignee: Olympus Optical Co., Ltd., Tokyo, Japan

[22] Filed: July 26, 1972

[21] Appl. No.: 275,428

[30] Foreign Application Priority Data
July 29, 1971  Japan.................. 46-67502

[52] U.S. Cl. ............................................ 128/6
[51] Int. Cl................................................ A61b 1/06
[58] Field of Search............................. 128/6–9, 11

[56] References Cited
UNITED STATES PATENTS
3,703,169   11/1972   Ouchi ............................. 128/6
3,089,484   5/1963    Hett ............................... 128/6
3,548,808   12/1970   Takahashi et al. ............... 128/6
3,572,325   3/1971    Bazell et al. .................... 128/6
3,643,653   2/1972    Takahashi et al. ............... 128/6

FOREIGN PATENTS OR APPLICATIONS
1,261,275   8/1962    Germany ........................ 128/6

Primary Examiner—Lucie H. Laudenslager
Attorney, Agent, or Firm—Flynn & Frishauf

[57] ABSTRACT

An endoscope comprising an object lens movable in the axial direction of the endoscope according to a varied distance between the observation end of the endoscope and the body cavity walls and a rotatable prism for transmitting reflections from the illuminated body cavity to the object lens whereby simple operation of said object lens and prism provides a proper focal distance and enables the desired region of the illuminated body cavity walls to be distinctly observed.

11 Claims, 6 Drawing Figures

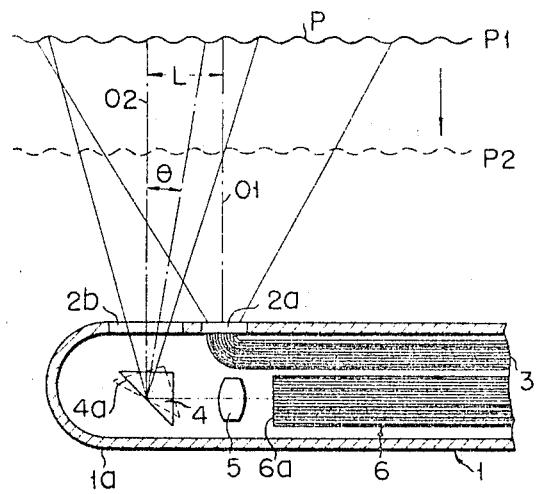
FIG. 1
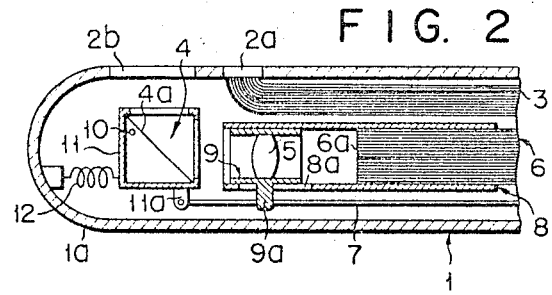
FIG. 2
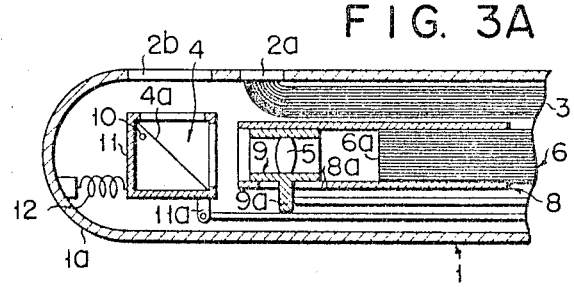
FIG. 3A
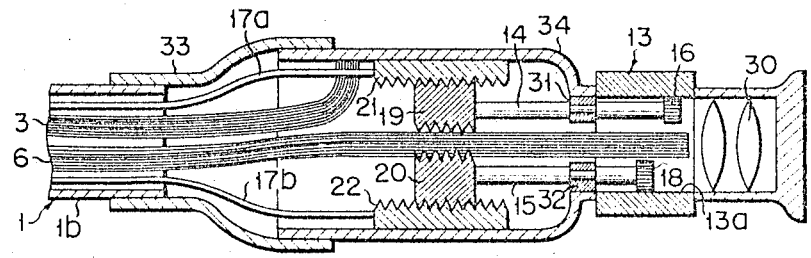

ENDOSCOPE

BACKGROUND OF THE INVENTION

This invention relates to an endoscope.

An endoscope generally has, as shown in FIG. 1, an illumination window 2a and an observation window 2b formed at the end 1a of a flexible tube 1 being inserted into the body cavity. Light transmitted through a bundle 3 of illumination optical fibers is cast on to the body cavity walls through said illumination window 2a. Reflections from the body cavity walls are conducted through said observation window 2b to an object lens 5 by means of a prism 4 having a reflection plane 4a. The object lens 5 has its focal point so adjusted as to converge the image of the illuminated body cavity walls on the front end face 6a of a bundle 6 of image transmission optical fibers. Accordingly, said image is brought to an eyepiece (not shown) through the bundle 6 of image transmission optical fibers.

Though the illumination and observation windows 2a and 2b are provided at the end 1a of the flexible tube 1 close to each other, yet the axis 01 of light projected through the illumination window 2a is unavoidably spaced by a certain distance L from the axis 02 of light brought to the observation window 2b. Due to the presence of said distance L, an illuminated region does not fully register in position with a region being observed.

When the body cavity walls P are located relatively remote from the end 1a of the flexible tube 1, for example, at a point indicated by reference notation P1, the observation region falls within the illumination region, permitting good observation or photographing. Where, however, the body cavity walls P are drawn for example by peristalsis close to the end 1a of the flexible tube 1, for example, to a point indicated by reference notation P2, then the observation region will be widely displaced from the illumination region, resulting in failure of proper observation. Further, as the body cavity walls are brought nearer to the end 1a of the flexible tube 1, the image of said walls presented at the front end face 6a of the bundle 6 of observation optical fibers gets gradually blurred.

It is accordingly the object of this invention to provide an endoscope capable of simultaneously adjusting the focal distance of an object lens according to the varying distances between the body cavity walls and the end of the flexible tube and always fixing the observation region within the illumination region.

SUMMARY OF THE INVENTION

According to an aspect of this invention, there is provided an endoscope, wherein the above-mentioned drawbacks are effectively eliminated by shifting the object lens for focal adjustment when the body cavity walls are drawn near the end 1a of the flexible tube 1, and rotating the reflector means for reflecting light introduced through the observation window 2b so as to deflect the optical axis 02, as shown in FIG. 1, through an angle $\theta$ toward the optical axis 01, thereby fixing the observation region within the illumination region. The reflection means (for example a prism) and object lens are connected to an operating section disposed at the rear end of the flexible tube so as to have their relative positions properly controlled by said operating section via a drive transmission means.

BRIEF DESCRIPTION OF THE DRAWINGS

FIG. 1 is a schematic cross sectional view of the end portion of an endoscope according to an embodiment of this invention by way of illustrating the principle by which said endoscope is operated;

FIG. 2 is a cross sectional view of the end portion of an endoscope according to one embodiment of the invention;

FIG. 3A is a cross sectional view of the end portion of an endoscope according to another embodiment of the invention;

FIG. 3B is a cross sectional view of the operating section of the embodiment of FIG. 3A;

DESCRIPTION OF THE PREFERRED EMBODIMENTS

Figure 4:
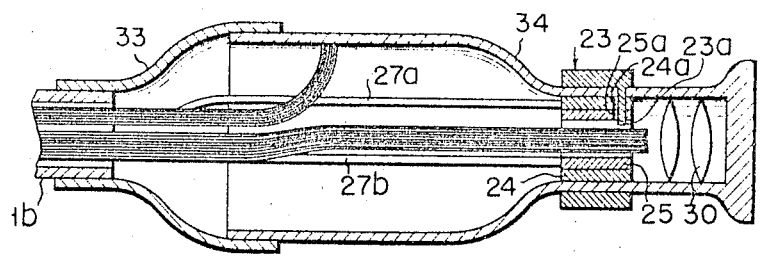
FIG. 4 is a cross sectional view of the operating section of an endoscope according to still another embodiment of the invention.

There will now be described by reference to the appended drawings an endoscope according to the various embodiments of this invention.

Referring to FIG. 2 showing the interior of the end portion 1a of the flexible tube 1 of an endoscope, the object lens 5 held by a support frame 9 freely slides through a guide cylinder 8 fitted to the front end portion of the bundle 6 of image transmission optical fibers as well as to the inner walls of the flexible tube 1. Said support frame 9 has a lug 9a connected to a flexible wire 7 stretched lengthwise of the flexible tube 1, and the lug 9a extends through the elongate hole 8a of the guide cylinder 8, the hole 8a being elongate in the direction of the optical axis of the object lens 5. The prism 4 positioned ahead of the object lens 5 and provided with a reflection plane 4a for conducting reflections from the body cavity walls to the object lens 5 is fitted to a support frame 11 pivotally attached to a shaft 10 fixed on the inner wall of the flexible tube 1. Said support frame 11 has at least one wire-fitting lug 11a which in turn is penetrated by a pin. The front end of the wire 7 which has a hooked or other suitable form can rotate about said pin. The rear end of the wire 7 is connected to the operating section (not shown) for focal adjustment disposed at the rear wnd of the flexible tube 1. Actuation of said operating section leads to the advance or retraction of the wire 7 to cause the object lens 5 to be shifted along the elongate hole 8a, thereby attaining the focal adjustment of the object lens 5 and the proper position of the prism 4. Said wire 7 is preferred to be inserted for reinforcement through a separate narrow flexible tube. To the prism 4 is connected a spring 12 fixed to the inner wall of the flexible tube 1 so as to rotate the prism 4 clockwise in FIG. 2. Said spring 12 keeps the wire 7 tightly stretched to attain easy and reliable advance and retraction.

If the body cavity walls P happen to be drawn near the end 1a of the flexible tube 1 while they are observed by an endoscope of the aforesaid arrangement, good observeraton can be effected simply by actuating the operating section for focal adjustment to retract the wire 7. Where the wire 7 is pulled back to a proper position, the object lens 5 slides along the elongate hole 8a to present a distinct image of the illuminated body cavity walls on the front end face 6a of the bundle 6 of image transmission optical fibers, and at the same time the prism 4 rotated about the shaft 10 fixes the observation region within the illumination region. Conversely here the body cavity walls P are removed from the end 1a of the flexible tube 1, the opposite operation to the preceding case by the advance of the wire 7 also realizes good observation.

The foregoing embodiment refers to the case where the prism 4 and object lens 5 were directly connected to the wire 7. Instead, it is possible to make the prism 4 and object lens 5 separately interlock the operating section for focal adjustment.

This second embodiment is presented in FIG. 3B. The endoscope operating section containing an eyepiece 30 and connected to the rear end 1b of the flexible tube 1 by means of a suitable connector 33 includes an operating ring 13 for focal adjustment which contains a gear 13a. This gear 13a engages pinion gears 16 and 18 connected to one end of rotation transmission rods 14 and 15 held by supports 31 and 32 fixed to the inner wall of the case 34 of the operating section. Said rods 14 and 15 which are adapted to rotate about their own axes are fitted at the other end with worms 19 and 20 engaging racks 21 and 22 respectively. To the rack 21 is connected the rear end of the wire 17a whose opposite end is fixed to the lug 9a of the lens support frame 9 shown in FIG. 3A. To the rack 22 is connected the rear end of another wire 17b whose opposite end is pivotally fitted to the lug 11a of the prism support frame 11. Rotation of the operating ring 13 for focal adjustment leads to the rotation of the pinion gears 16 and 18 and in consequence the rods 14 and 15 through worms 19 and 20. The rotation of the worms 19 and 20 is converted to the linear movement of the racks 21 and 22, resulting in the advance or retraction of the wires 17a and 17b. The wire 17a causes the object lens 5 to be moved along its optical axis for focal adjustment, and the wire 17b causes the prism 4 to rotate so as to fix the observation region within the illumination region. The amount of movement of the object lens 5 resulting from the rotation of the operating ring 13 and the angle through which the prism 4 is rotated are properly controlled by the ratio of the number of teeth of the gear 13a disposed inside of the operating ring 13 to those of the pinion gears 16 and 18 as well as by the distance of the linear movement of the racks 21 and 22 caused by the rotation of the worms 19 and 20. The bundle 6 of image transmission optical fibers is supported substantially at the axial center of the case 34 by means of a proper support (not shown for briefness of drawing). The rear end of the bundle 3 of illumination optical fibers is connected through the case 34 to a suitable external source of light. According to the embodiment of FIGS. 3A and 3B, there is not a proportionate relationship between the distance of linear movement of the wire 17b and the rotation angle of the prism 4 and in consequence between the rotation angle of the operating ring 13 and that of the prism 4. Let it be assumed that the operating ring 13 is rotated to retract the wire 17b from its position shown in FIG. 3A. Then the prism 4 initially makes a wide rotation and later through an angle substantially proportionate to that through which the operating ring 13 turns. Accordingly, the prism 4 undesirably makes non-uniform rotations even when the wire 17b is moved at the same rate by proper rotation of the operating ring 13.

Figure 5:
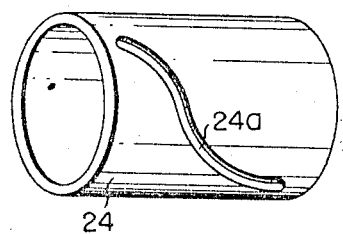
FIG. 5 is a perspective view of a cylindrical member provided with a cam slot which is driven by said endoscope operating section.

There will now be described by reference to FIG. 4 the operating section for focal adjustment according to another embodiment of this invention which enables the operating ring 13 and prism 4 to make rotations always through proportionate angles. The endoscope operating section connected to the rear end 1b of the flexible tube 1 by the suitable connector 33 and containing the eyepiece 30 has an operating ring 23 for focal adjustment provided with an inwardly projecting pin 23a. This pin 23a is inserted into the operating ring 23 and penetrates cam slots 24a and 25a bored in double cylinders 24 and 25 respectively. The cylinders 24 and 25 have a slightly smaller diameter than the operating ring 23. When the operating ring 23 rotates, said double cylinders 24 and 25 do not turn, but independently move only in the axial direction according to the shapes of the cam slots 24a and 25a respectively. To said double cylinders 24 and 25 are connected the rear end of a wire 27a having its outer end connected to the lug 9a of the lens support frame 9 (FIG. 3A) and the rear end of a wire 27b having its outer end pivotally fitted to the lug 11a of the prism support frame 11. The cam slots 24a and 25a of the double cylinders 24 and 25 are so shaped, as illustrated in FIG. 5, that where there occurs a change in the distance between the body cavity walls P and the front end of the flexible tube of an endoscope, the focal adjustment of the object lens 5 and the proper position of the prism 4 can be attained at the same time by rotating the operating ring 23. Rotation of the operating ring 23 causes the double cylinders 24 and 25 to make a linear movement independently by means of the pin 23a penetrating the cam slots 24a and 25a in the axial direction of the operating ring 23 according to the shapes of the cam holes 24a and 25a. Said linear movements are transmitted to the wires 27a and 27b, thereby shifting the object lens 5 for focal adjustment for a distance corresponding to the rotation angle of the operating ring 23 and also rotating the prism 4 through an angle corresponding to the rotation angle of said operating ring 23 so as to fix the observation region in the illumination region.

What we claim is:

1. An endoscope comprising:
   a flexible tube;
   an observation optical system for image transmission and an illumination optical system both mounted in said flexible tube;
   a movable object lens assembly disposed on the optical axis of said observation optical system so as to face its light receiving plane;
   rotatable reflection means for conducting reflections from a foreground subject illuminated by said illumination optical system to said object lens assembly;
   an operating section for driving said object lens assembly and said rotatable reflection means, said operation section including a tubular case connected to said flexible tube and an operating ring rotatably mounted on the tubular case, said operating ring being non-slidable in the axial direction of the tubular case; and
   drive transmission means disposed in said tubular case and engaged with said operation ring for converting the rotation of said operation ring to linear motion in the axial direction of said tubular case and transmitting said linear motion to said object lens assembly and reflection means, thereby simultaneously causing said object lens assembly to travel linearly and said reflection means to rotate to an extent corresponding to the rotation of said operating ring.

2. The endoscope according to claim 1 wherein said drive transmission means includes a single flexible filament connecting said object lens assembly and reflection means to said operating ring.

3. The endoscope according to claim 1 wherein:
said rotatable operating ring contains a gear; and
said drive transmission means comprises a gear disposed inside of said operating ring and engaging said operating ring gear, first and second additional gears for independently coupling out the rotating moment of said operating ring, first and second conversion means connected to said first and second additional gears so as to convert the rotation of said additional gears to respective linear movements, and first and second flexible filaments respectively coupled to said first and second conversion means for conducting said linear movements to said object lens assembly and reflection means.

4. The endoscope according to claim 3 which further comprises a spring connected between the inner wall of the flexible tube and said reflection means for biasing said reflection means in the direction in which said second flexible filament is stretched.

5. The endoscope according to claim 3 wherein said drive transmission means includes a pair of gears disposed inside said operating ring and respectively coupled to said first and second additional gears.

6. The endoscope according to claim 3 wherein said first and second conversion means respectively comprise first and second linearly movable rack gears coupled respectively to said first and second additional gears.

7. The endoscope according to claim 1 wherein:
said rotatable operating ring has at least one pin projectively extending from the inner wall thereof; and said drive transmission means comprises first and second cylindrical members for converting a rotation of said operating ring into a linear movement in the axial direction of said operating ring, said first and second cylindrical members including on the side walls thereof first and second cam slots, respectively, for engaging said extending pin of the operating ring, such that upon rotation of the operating ring, said cylindrical members independently make a linear movement in said axial direction of said operating ring according to the shapes of said cam slots; and first and second flexible filaments for respectively transmitting said linear movements of said first and second cylindrical members to said object lens assembly and reflection means.

8. The endoscope accoring to claim 1 which further comprises a spring connected between the inner wall of the flexible tube and said reflection means for biasing said reflection means in the direction in which said second flexible filament is stretched.

9. The endoscope according to claim 7 wherein said cam slots are differently shaped such that different degrees of linear motion are imparted to said first and second cylindrical members upon rotation of said operating ring.

10. The endoscope according to claim 7 wherein said operating ring has a single pin extending inwardly therefrom, said single pin commonly engaging said cam slots of said first and second cylindrical members.

11. The endoscope according to claim 7 wherein said first and second cylindrical members are coaxially mounted within said tubular case.

* * * * *

UNITED STATES PATENT OFFICE
CERTIFICATE OF CORRECTION

Patent No. 3,804,081            Dated April 16, 1974

Inventor(s) Kunio KINOSHITA et al

It is certified that error appears in the above-identified patent and that said Letters Patent are hereby corrected as shown below:

Column 4, line 57, change "operation section" to
--operating section--;

line 62, after "transmission means" insert
--at least partially--.

Signed and sealed this 10th day of September 1974.

(SEAL)
Attest:

McCOY M. GIBSON, JR.           C. MARSHALL DANN
Attesting Officer              Commissioner of Patents